(12) United States Patent
Yamamoto

(10) Patent No.: US 9,491,369 B2
(45) Date of Patent: Nov. 8, 2016

(54) ELECTRONIC APPARATUS INCLUDING HINGE MECHANISM ROTATIONALLY SUPPORTING DISPLAY UNIT

(71) Applicant: CANON KABUSHIKI KAISHA, Tokyo (JP)

(72) Inventor: Jiro Yamamoto, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/825,395

(22) Filed: Aug. 13, 2015

(65) Prior Publication Data

US 2016/0057358 A1  Feb. 25, 2016

(30) Foreign Application Priority Data

Aug. 21, 2014  (JP) ................................ 2014-168366

(51) Int. Cl.
*H04N 5/225* (2006.01)
*H04N 5/232* (2006.01)

(52) U.S. Cl.
CPC ........ *H04N 5/23293* (2013.01); *H04N 5/2252* (2013.01)

(58) Field of Classification Search
CPC ........... H04N 5/23293; H04N 5/2252; H04N 5/225; H04N 5/2251; G11B 33/06; G03B 13/06; G03B 17/02; G03B 17/20; G03B 17/14; G03B 13/02; H01R 35/02; E05D 7/10; E05D 5/14
See application file for complete search history.

(56) References Cited

U.S. PATENT DOCUMENTS

| | | | |
|---|---|---|---|
| 4,757,388 A | 7/1988 | Someya et al. | |
| 6,741,287 B1 * | 5/2004 | Fuchimukai | H04N 5/2251 348/333.06 |
| 8,059,193 B2 * | 11/2011 | Hayashi | H04N 5/2251 348/333.06 |
| 2004/0231105 A1 * | 11/2004 | Ahn | H01R 35/02 16/367 |
| 2006/0075602 A1 * | 4/2006 | Oh | G06F 1/1686 16/297 |
| 2012/0188726 A1 * | 7/2012 | Nonaka | G06F 1/1616 361/727 |
| 2013/0100336 A1 * | 4/2013 | Shintani | H04N 5/23209 348/345 |
| 2015/0334273 A1 * | 11/2015 | Yanagisawa | H04N 5/2251 348/373 |
| 2016/0044808 A1 * | 2/2016 | Mitsui | H05K 5/0017 361/679.01 |
| 2016/0066451 A1 * | 3/2016 | Mitsui | H05K 5/0221 348/333.06 |

FOREIGN PATENT DOCUMENTS

| | | |
|---|---|---|
| JP | 2000-013651 A | 1/2000 |
| JP | 3687163 B | 8/2005 |

* cited by examiner

*Primary Examiner* — Aung S Moe
(74) *Attorney, Agent, or Firm* — Cowan, Liebowitz & Latman, P.C.

(57) ABSTRACT

A first hinge section is attached to a camera body rotationally about a first shaft. A second hinge section is attached to the first hinge section rotationally about a second shaft. A display unit is attached to the second hinge section. A protrusion-shaped portion is provided in the camera body. A locking pawl is provided in the first hinge section. Locking portions are provided in the second hinge section. When the display unit is closed, the locking pawl and one locking portion, and the protrusion-shaped portion and the other locking portion, are in locking engagement. Rotation of the display unit only about the first shaft from the closed state releases locking of the pawl, and rotation of the same about the second shaft from the closed state releases locking of the pawl and the protrusion-shaped portion.

6 Claims, 10 Drawing Sheets

FIG. 3
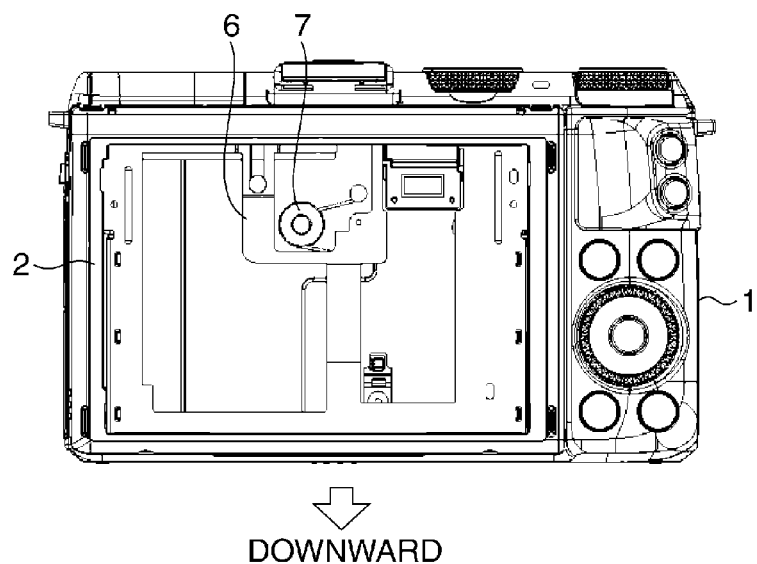
⇩ DOWNWARD
FIG. 4A  FIG. 4B
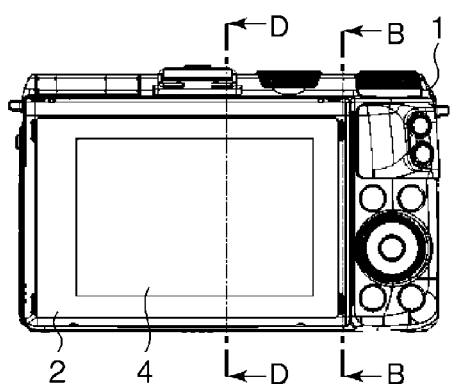 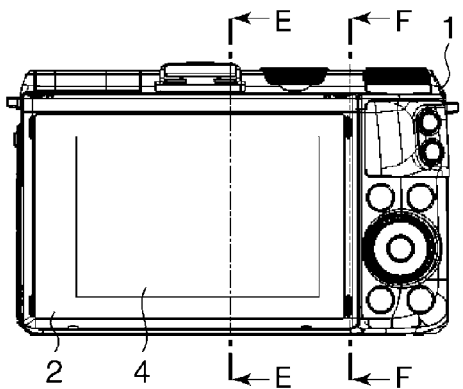

FIG. 5A
FIG. 5C
FIG. 5B
FIG. 5D
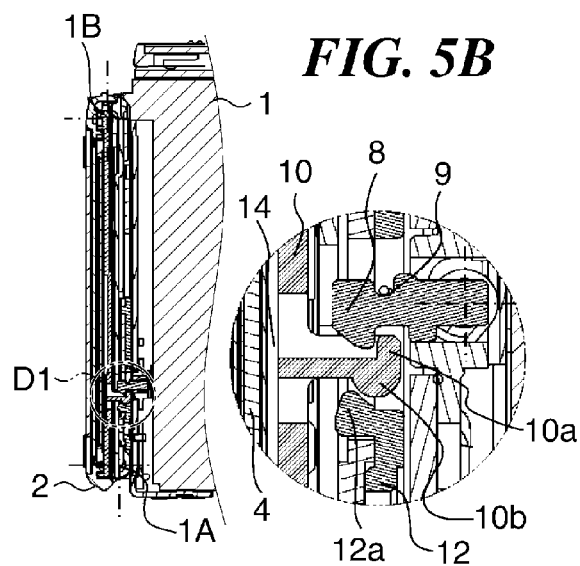
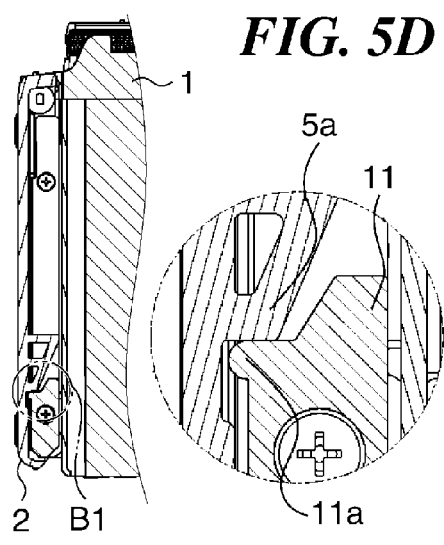

FIG. 6A
FIG. 6C
FIG. 6B
FIG. 6D
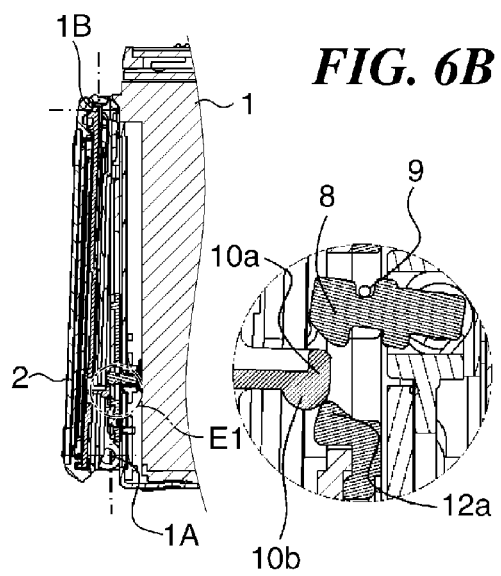
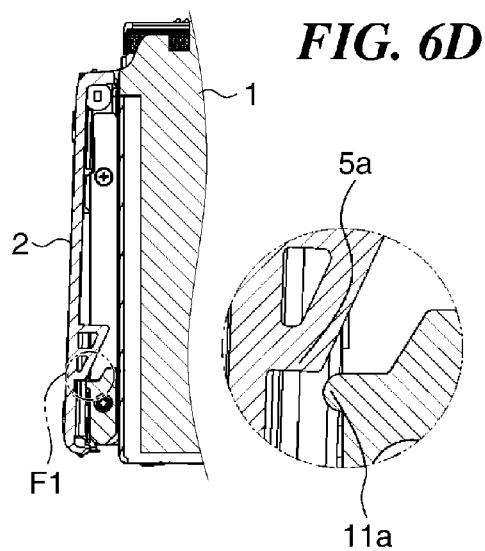

FIG. 10A
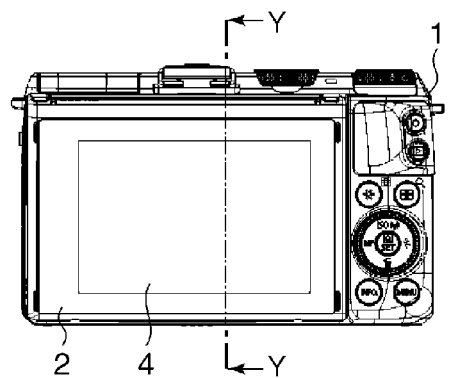
FIG. 10B
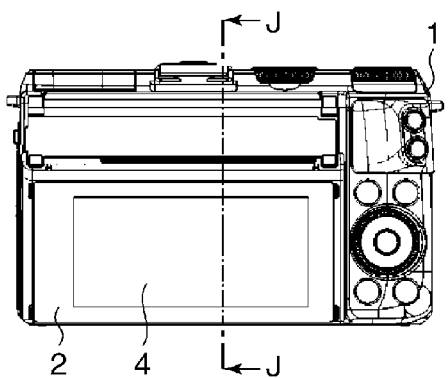
FIG. 11A
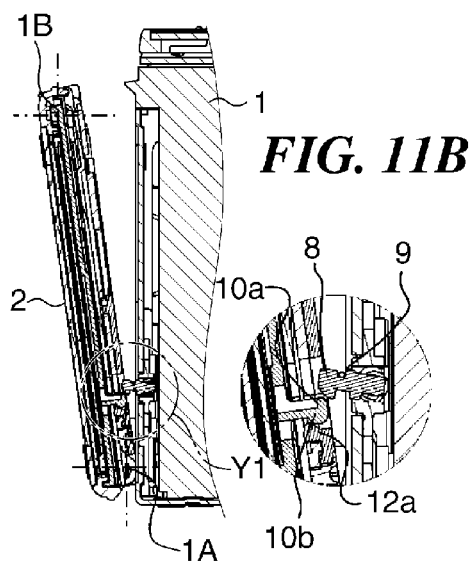
FIG. 11C
FIG. 11B
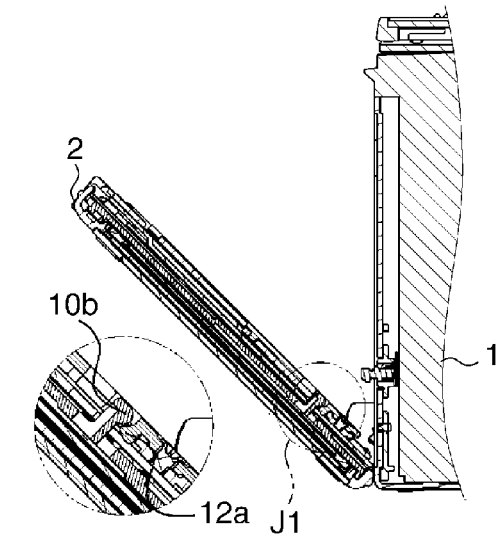
FIG. 11D

ELECTRONIC APPARATUS INCLUDING HINGE MECHANISM ROTATIONALLY SUPPORTING DISPLAY UNIT

BACKGROUND OF THE INVENTION

1. Field of the Invention

The invention relates to an electronic apparatus, such as a digital camera or a digital video camera, and more particularly to an electronic apparatus in which a display unit is rotationally supported by an apparatus body about a hinge mechanism.

2. Description of the Related Art

Conventionally, there has been proposed an electronic apparatus, such as a digital camera, which is equipped with a hinge mechanism that rotationally connects a first hinge section to an apparatus body via a first rotational shaft, and rotationally connects a second hinge section holding a display unit to the first hinge section via a second rotational shaft (see Publication of Japanese Patent No. 3687163). In the proposed electronic apparatus, by properly operating the display unit with respect to the apparatus body such that it is rotated about the first rotational shaft and/or the second rotational shaft, it is possible to orient a display screen of the display unit in a direction suitable for low-angle photographing, high-angle photographing, or self-photographing.

As for Publication of Japanese Patent No. 3687163, however, when performing photographing after the display unit is rotated about the first rotational shaft, if a finger or the like of a photographer carelessly enters between the first hinge section and the display unit, there is a fear that the display unit is rotated about the second rotational shaft. In this case, since the orientation of the display screen is changed, the photographer is required to correct a rotational angle of the display unit during photographing, which degrades user-friendliness.

SUMMARY OF THE INVENTION

The invention provides an electronic apparatus which has a display unit supported via a hinge mechanism having two rotational shafts, in a manner rotatable with respect to an apparatus body, and is configured to prevent an orientation of a display screen of the display unit from being carelessly changed during photographing.

The invention provides an electronic apparatus comprising a first hinge member configured to be attached to a body of the electronic apparatus such that the first hinge member is rotated with respect to the body of the electronic apparatus about a first rotational shaft, a second hinge member configured to be attached to the first hinge member such that the second hinge member is rotated with respect to the first hinge member about a second rotational shaft, a display unit configured to be attached to the second hinge member, a first locking portion configured to be provided in the body of the electronic apparatus, a second locking portion configured to be provided in the first hinge member, a first locked portion configured to be provided in the second hinge member, and a second locked portion configured to be provided in the second hinge member, wherein the first rotational shaft is arranged on one side of the first hinge member, and the second rotational shaft is arranged on another side of the first hinge member, wherein when the display unit is in an accommodated state in which the display unit is accommodated in the body of the electronic apparatus, the body of the electronic apparatus, the first hinge member, the second hinge member, and the display unit are superposed one upon another, whereby the first locking portion locks the first locked portion, and the second locking portion locks the second locked portion, wherein when the display unit is rotated about the first rotational shaft from the accommodated state without being rotated about the second rotational shaft from the accommodated state, locking engagement between the first locking portion and the first locked portion is released while maintaining locking of the second locked portion by the second locking portion, and wherein when the display unit is rotated about the second rotational shaft from the accommodated state, the locking engagement between the first locking portion and the first locked portion is released, and locking engagement between the second locking portion and the second locked portion is released.

According to the invention, in the electronic apparatus which has the display unit supported via the hinge mechanism having two rotational shafts, in a manner rotatable with respect to the apparatus body, it is possible to prevent the orientation of the display screen of the display unit from being carelessly changed during photographing.

Further features of the invention will become apparent from the following description of exemplary embodiments (with reference to the attached drawings).

BRIEF DESCRIPTION OF THE DRAWINGS

FIG. 3 is a view of the digital camera shown in FIG. 1A in a state in which a display panel is removed from the display unit, as viewed from the rear of a camera body.

FIG. 4A is a view of the digital camera shown in FIG. 1A in a state in which the display unit is closed with respect to the camera body, as viewed from the rear of the camera body.

FIG. 4B is a view of the digital camera shown in FIG. 1A in a state in which the display unit is rotated together with a second hinge section from the state in which the display unit is closed with respect to the camera body, as viewed from the rear of the camera body.

FIG. 5A is a cross-sectional view taken on line D-D of FIG. 4A.

FIG. 5B is an enlarged view of a D1 portion appearing in FIG. 5A.

FIG. 5C is a cross-sectional view taken on line B-B of FIG. 4A.

FIG. 5D is an enlarged view of a B1 portion appearing in FIG. 5C.

FIG. 6A is a cross-sectional view taken on line E-E of FIG. 4B.

FIG. 6B is an enlarged view of an E1 portion appearing in FIG. 6A.

FIG. 6C is a cross-sectional view taken on line F-F of FIG. 4B.

FIG. 6D is an enlarged view of an F1 portion appearing in FIG. 6C.

FIG. 10A is a view of the digital camera shown in FIG. 1A in a state in which the display unit has been rotated from the closed state through approximately 8° together with a first hinge section and a second hinge section, as viewed from the rear of the camera body.

FIG. 10B is a view of the digital camera shown in FIG. 1A in a state in which the display unit has been rotated from the closed state through approximately 45° with the first hinge section and the second hinge section, as viewed from the rear of the camera body.

FIG. 11A is a cross-sectional view taken on line Y-Y of FIG. 10A.

FIG. 11B is an enlarged view of a Y1 portion appearing in FIG. 11A.

FIG. 11C is a cross-sectional view taken on line J-J of FIG. 10B.

FIG. 11D is an enlarged view of a J1 portion appearing in FIG. 11C.

DESCRIPTION OF THE EMBODIMENTS

The invention will now be described in detail below with reference to the accompanying drawings showing embodiments thereof.

Figure 1A:
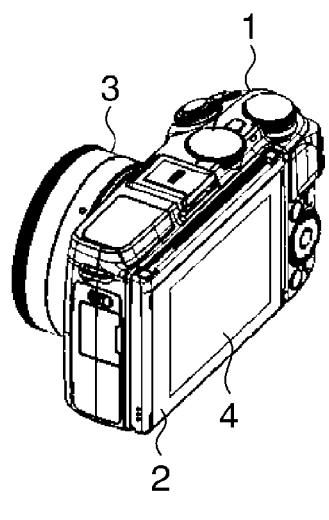
FIG. 1A is a perspective view of a digital camera as an electronic apparatus according to an embodiment of the invention, in a state in which a display unit thereof is closed, as viewed from the rear of the digital camera.
Figure 1B:
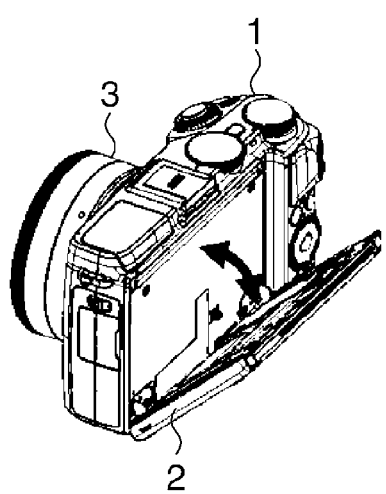
FIG. 1B is a perspective view of the digital camera in a state in which the display unit is rotated from the FIG. 1A state via one of rotational shafts of a hinge mechanism.
Figure 1C:
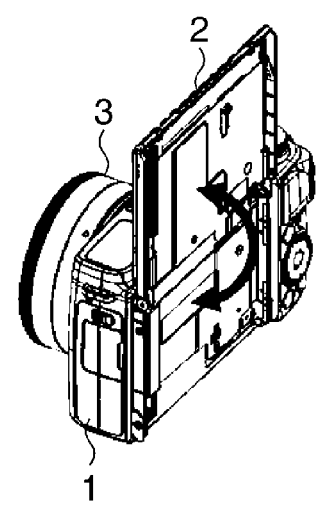
FIG. 1C is a perspective view of the digital camera in a state in which the display unit is rotated from the FIG. 1A state via the other of the rotational shafts of the hinge mechanism such that the display unit faces toward an object.

FIGS. 1A to 1C are perspective views of a digital camera as an electronic apparatus according to an embodiment of the invention, as viewed from the rear of the same.

As shown in FIGS. 1A to 1C, the digital camera of the present embodiment has a lens barrel 3 provided on a front side of a camera body 1. On a rear side of the camera body 1, a display unit 2 is supported such that the display unit 2 can be rotated about a hinge mechanism 20, described hereinafter, in an opening/closing direction. The camera body 1 corresponds to an apparatus body of the invention.

FIG. 1A shows a state in which the display unit 2 is closed with respect to the camera body 1. A rear-side surface of the camera body 1 and the display unit 2 are disposed in parallel with each other. Further, in the closed state of the display unit 2, a display panel 4 forming the display screen of the display unit 2 faces toward the rear side.

FIG. 1B is a perspective view of the digital camera in a state in which the display unit 2 is rotationally operated through approximately 45° from the FIG. 1A state about a rotational shaft 1A (see FIG. 2) of the hinge mechanism 20, described hereinafter. In the FIG. 1B state, the display unit 2 is disposed in a position suitable for high-angle photographing which is performed with the camera body 1 lifted up to a position higher than the height of the eyes of a photographer.

FIG. 1C is a perspective view of the digital camera in a state in which the display unit 2 is rotated through approximately 180° from the FIG. 1A state about a rotational shaft 1B (see FIG. 2) of the hinge mechanism 20, described hereinafter, whereby the display panel 4 is disposed above the camera body 1 to face toward an object. In the FIG. 1C state, the display unit 2 is disposed in a position suitable mainly for self-photographing.

Figure 2:
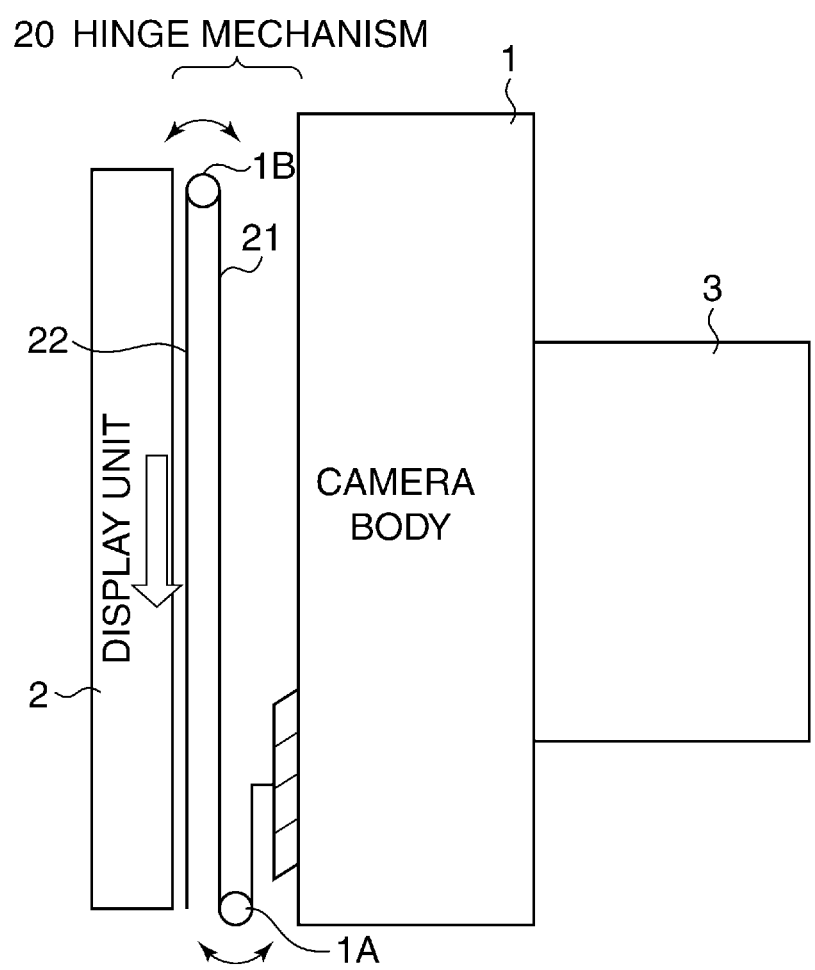
FIG. 2 is a schematic side view of the digital camera shown in FIG. 1A.

FIG. 2 is a schematic side view of the digital camera shown in FIG. 1A. Referring to FIG. 2, the hinge mechanism 20 includes a first hinge section 21 which is supported on a rear bottom side of the camera body 1 such that the first hinge section 21 can be rotated about the rotational shaft 1A, and a second hinge section 22 which is supported by the first hinge section 21 such that the second hinge section 22 can be rotated about the rotational shaft 1B parallel to the rotational shaft 1A. The rotational shaft 1A corresponds to a first rotational shaft of the invention, and the rotational shaft 1B corresponds to a second rotational shaft of the invention.

In the closed state of the display unit 2, shown in FIG. 2, the first hinge section 21 is disposed in substantially parallel with the rear side of the camera body 1, and the second hinge section 22 is disposed in substantially parallel with the first hinge section 21 at a location where the second hinge section 22 and the camera body 1 sandwich the first hinge section 21 therebetween. In other words, when the display unit 2 is in a state accommodated in the camera body 1, the camera body 1, the first hinge unit 21, the second hinge unit 22, and the display unit 2 are superposed one upon another. Further, the rotational shaft 1B is disposed in substantially parallel with the rotational shaft 1A on a rear top side of the camera body 1. The display unit 2 is held such that it is slidable, vertically as viewed in FIG. 2, with respect to a surface of the second hinge section 22 opposite to a surface of the second hinge section 22 facing the first hinge section 21.

The rotational shaft 1A supports the first hinge section 21 such that the first hinge section 21 can be rotated from the FIG. 2 state within an angle range of approximately 45°, in a state having predetermined sliding torque. When the first hinge section 21 is caused to rotate through approximately 45° about the rotational shaft 1A, the second hinge section 22 and the display unit 2 as well are rotated in unison with the first hinge section 21, whereby it is possible to cause the display screen of the display unit 2 to face in a direction suitable for high-angle photographing.

Further, the rotational shaft 1B supports the display unit 2 and the second hinge section 22 such that they can be rotated from the FIG. 2 state within an angle range of approximately 180°, in a state having predetermined sliding torque. By causing the display unit 2 and the second hinge section 22 to rotate from the FIG. 2 state through approximately 180°, it is possible to cause the display screen of the display unit 2 to face in a direction suitable for self-photographing.

Here, the display unit 2 is held by the second hinge section 22 such that it is slidable with respect to the second hinge section 22. For this reason, when the display unit 2 is caused to rotate about the rotational shaft 1B, the display unit 2 is caused to slide downward with respect to the second hinge section 22, whereby it is possible to increase a protruding height of the display screen from a top of the camera body 1 after the display unit 2 and the second hinge section 22 have been rotated through approximately 180°. As a consequence, when the display screen of the display unit 2 is viewed from an object side, it is possible to visually recognize a large display range without being vignetted by the top surface of the camera body 1.

FIG. 3 is a view of the digital camera shown in FIG. 1A in a state in which the display panel 4 is removed from the display unit 2, as viewed from the rear of the camera body 1. As shown in FIG. 3, a slide plate 6 for holding the display unit 2 such that the display unit 2 is slidable in the vertical direction, as viewed in FIG. 3, is formed on a side of the display unit 2 toward the second hinge section 22. The slide plate 6 is urged downward, as viewed in FIG. 3, by an urging spring 7. More specifically, the display unit 2, in the closed state thereof, is urged downward with respect to the camera body 1 by the urging spring 7.

Next, the rotational operation that is performed by the display unit 2 with respect to the camera body 1 about the hinge mechanism 20 will be described with reference to FIGS. 4A to 9B.

FIG. 4A is a view of the digital camera in a state in which the display unit 2 is closed with respect to the camera body 1, as viewed from the rear of the camera body 1. FIG. 5A is a cross-sectional view taken on line D-D of FIG. 4A, and FIG. 5B is an enlarged view of a D1 portion appearing in FIG. 5A. FIG. 5C is a cross-sectional view taken on line B-B of FIG. 4A, and FIG. 5D is an enlarged view of a B1 portion appearing in FIG. 5C.

As shown in FIGS. 5A and 5B, a locking pawl 8 is held on a rear surface of the camera body 1 such that it can be rotated, and is urged in a counterclockwise direction, as viewed in FIGS. 5A and 5B, by an urging spring 9. Further, the second hinge section 22 includes a holder 10 for holding the display panel 4. The holder 10 is slidably attached to the second hinge section 22, and is formed with a locking portion 10a with which the locking pawl 8 is in locking engagement when the display unit 2 is in the closed state. Further, a locking portion 10b is formed at a lower portion of the locking portion 10a, as viewed in FIG. 5B.

A protruded-shape portion 12a of a protective cover 12 provided in the first hinge section 21, for protecting an FPC (flexible printed circuit board) 13 (see FIG. 9B), described hereinafter, is brought into locking engagement with the locking portion 10b. Therefore, although the display unit 2 is held by the rotational shaft 1B such that it can be rotated about the rotational shaft 1B, it cannot be rotated unless locking engagement between the locking pawl 8 and the locking portion 10a and locking engagement between the protrusion-shaped portion 12a and the locking portion 10b are released. Here, the locking pawl 8 and the locking portion 10a correspond to a first locking portion and a first locked portion of the invention, respectively, and the protrusion-shaped portion 12a and the locking portion 10b correspond to a second locking section and a second locked section of the invention, respectively.

Referring to FIGS. 5C and 5D, each of short-side portions on respective opposite sides of the display unit 2 is formed with a contact portion 5a. A bottom surface of the contact portion 5a is received by a receiving portion 11a formed on a side surface cover 11 of the first hinge section 21. Therefore, although the display unit 2 is urged downward by the urging spring 7, the bottom surface of the contact portion 5a is received by the receiving portion 11a, whereby the display unit 2 is at rest at a predetermined position.

FIG. 4B is a view of the digital camera in a state in which the display unit 2 is rotated together with the second hinge section 22 about the rotational shaft 1B through approximately 2° from the closed state thereof with respect to the camera body 1, as viewed from the rear of the camera body 1. FIG. 6A is a cross-sectional view taken on line E-E of FIG. 4B, and FIG. 6B is an enlarged view of an E1 portion appearing in FIG. 6A. FIG. 6C is a cross-sectional view taken on line F-F of FIG. 4B, and FIG. 6D is an enlarged view of an F1 portion appearing in FIG. 6C.

As shown in FIGS. 6A and 6B, when the display unit 2 is rotated together with the second hinge section 22 about the rotational shaft 1B through approximately 2°, the locking pawl 8 is rotated in a clockwise direction, as viewed in FIGS. 6A and 6B, against the urging force of the urging spring 9, whereby the locking engagement between the locking pawl 8 and the locking portion 10a is released. Further, similarly, the protrusion-shaped portion 12a and the locking portion 10b are elastically deformed relative to each other, whereby the locking engagement therebetween is released. Therefore, to cause the display unit 2 to rotate about the rotational shaft 1B from its closed state, predetermined initial torque is required, whereby it is possible to prevent the photographer from carelessly rotating the display unit 2.

Further, by rotating the display unit 2 about the rotational shaft 1B through 2° from the closed state, the contact portion 5a is retreated from the receiving portion 11a, as shown in FIGS. 6C and 6D. This causes the display unit 2 to be slid downward by the urging force of the urging spring 7.

Figure 7A:
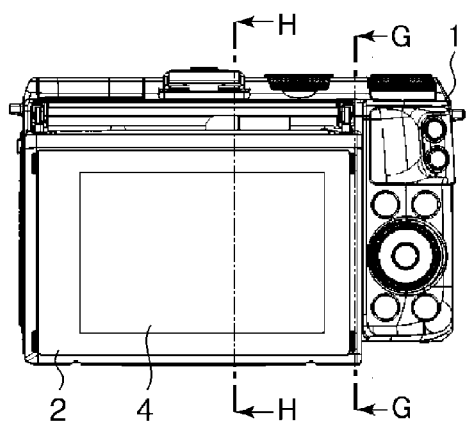
FIG. 7A is a view of the digital camera shown in FIG. 1A in a state in which the display unit has slid downward from the closed state, and then has been rotated through approximately 6°, as viewed from the rear of the camera body.
Figures 8A, 8B, 8C, 8D:
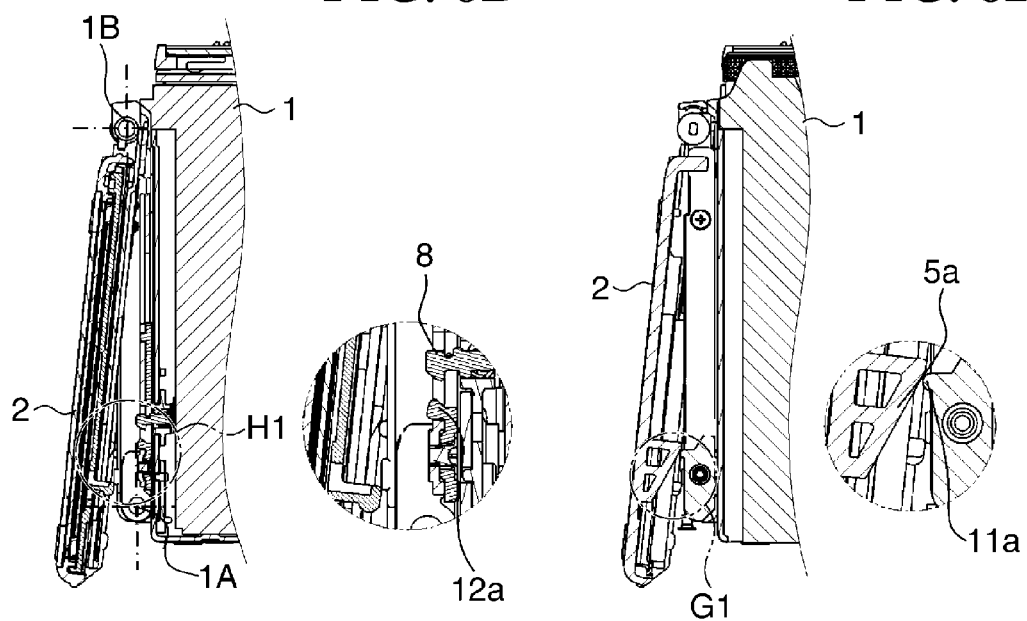
FIG. 8A is a cross-sectional view taken on line H-H of FIG. 7A.
FIG. 8B is an enlarged view of an H1 portion appearing in FIG. 8A.
FIG. 8C is a cross-sectional view taken on line G-G of FIG. 7A.
FIG. 8D is an enlarged view of a G1 portion appearing in FIG. 8C.

FIG. 7A is a view of the digital camera in a state in which the display unit 2 has slid downward 7.7 mm from the closed state, and then has been rotated about the rotational shaft 1B through approximately 6°, as viewed from the rear of the camera body 1. FIG. 8A is a cross-sectional view taken on line H-H of FIG. 7A, and FIG. 8B is an enlarged view of an H1 portion appearing in FIG. 8A. FIG. 8C is a cross-sectional view taken on line G-G of FIG. 7A, and FIG. 8D is an enlarged view of a G1 portion appearing in FIG. 8C.

As shown in FIGS. 8A and 8B, after the display unit 2 has been rotated about the rotational shaft 1B through 2° from the closed state, the locking engagement state of the locking pawl 8 and that of the protrusion-shaped portion 12a are released, whereby the display unit 2 can be rotated by predetermined torque by a torque washer (not shown) provided on the rotational shaft 1B.

Further, as shown in FIGS. 8C and 8D, as the display unit 2 is slid downward, a sloped surface formed on the contact portion 5a is slid over the receiving portion 11a. For this reason, as the display unit 2 is slide downward, a rotational angle of the display unit 2 about the rotational shaft 1B is gradually increased, and becomes approximately 6° after completion of sliding of the display unit 2 over the receiving portion 11a. After that, as shown in FIGS. 7B, 9A, and 9B, the display unit 2 rotated about the rotational shaft 1B until the rotational angle becomes 180°, where a rotational motion restricting portion (not shown) restricts further rotation thereof.

Figure 7B:
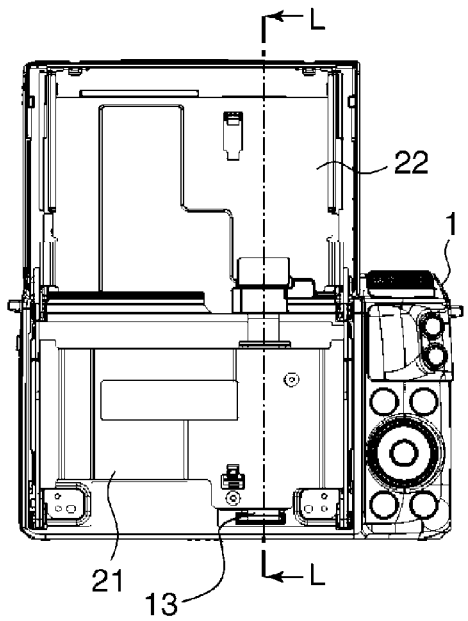
FIG. 7B is a view of the digital camera shown in FIG. 1A in a state in which the display unit has slid downward from the closed state, and then has been rotated through approximately 180°, as viewed from the rear of the camera body.

FIG. 7B is a view of the digital camera in a state in which after being slid downward 7.7 mm from the closed state, the display unit 2 has been rotated about the rotational shaft 1B through approximately 180°, as viewed from the rear of the camera body 1. FIG. 9A is a cross-sectional view taken on line L-L of FIG. 7B, and FIG. 9B is an enlarged view of an L1 portion appearing in FIG. 9A.

Figure 9A:
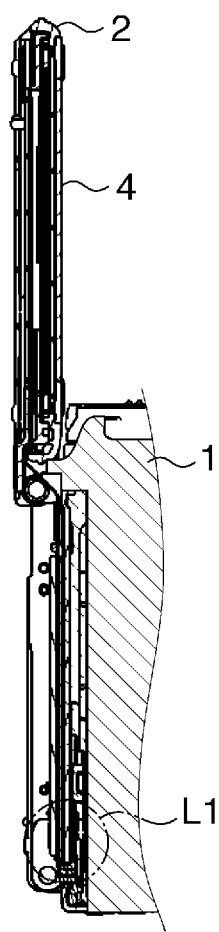
FIG. 9A is a cross-sectional view taken on line L-L of FIG. 7B.
Figure 9B:
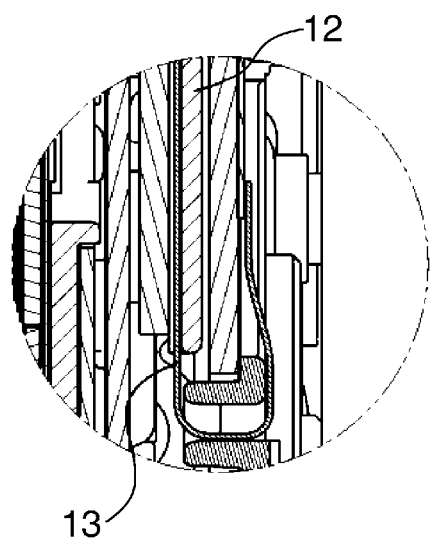
FIG. 9B is an enlarged view of an L1 portion appearing in FIG. 9A.

Referring to FIGS. 7B, 9A, and 9B, the FPC 13 electrically connects the camera body 1 and the display unit 2. The FPC 13 is formed with signal wiring for supplying necessary electric signals to the display panel 4, and has a thickness of approximately 0.1 mm. For this reason, the FPC 13 is protected by the protective cover 12 such that the user is prevented from carelessly cutting the FPC 13.

Incidentally, although in the present embodiment, a liquid crystal panel is used as the display panel 4, the liquid crystal panel has a property that when it is partially pressurized from a reverse side thereof, distortion or the like of an optical sheet is caused, which makes the display prone to be disturbed.

To solve this problem, in the present embodiment, as shown in FIG. 5B, a gap 14 is formed between the holder 10 and the display panel 4 such that when the locking portion 10b of the holder 10 of the second hinge section 22 is elastically deformed, force due to the elastic deformation is prevented from being transferred to the reverse side of the display panel 4. This gap is set to approximately 0.4 mm.

Next, a rotational operation of the display unit 2 from the closed state to a high-angle photographing state will be described with reference to FIG. 10A to FIG. 13.

FIG. 10A is a view of the digital camera in a state in which the display unit 2 has been rotated about the rotational shaft 1A from the closed state through approximately 8° together with the first hinge section 21 and the second hinge section 22, as viewed from the rear of the camera body 1. FIG. 11A is a cross-sectional view taken on line Y-Y of FIG. 10A, and FIG. 11B is an enlarged view of a Y1 portion appearing in FIG. 11A. FIG. 10B is a view of the digital camera in a state in which the display unit 2 has been rotated about the rotational shaft 1A from the closed state through approximately 45° together with the first and second hinge sections 21 and 22, as viewed from the rear of the camera body 1. FIG. 11C is a cross-sectional view taken on line J-J of FIG. 10B, and FIG. 11D is an enlarged view of a J1 portion appearing in FIG. 11C.

As shown in FIGS. 10A, 10B, and 11A to 11D, when the display unit 2 is rotated about the rotational shaft 1A gradually from the closed state, the locking portion 10a formed in the holder 10 of the second hinge section 22 pushes up the locking pawl 8 against the urging force of the urging spring 9, to cause the locking pawl 8 to rotate in a clockwise direction, as viewed in FIG. 11B. Note that in the closed state of the display unit 2, the locking engagement between the locking pawl 8 and the locking portion 10a is maintained by the urging force of the urging spring 9, and hence it is possible to prevent the display unit 2 from being carelessly rotated about the rotational shaft 1A.

As shown in FIGS. 11A to 11D, when the display unit 2 is rotated about the rotational shaft 1A through approximately 8° together with the first hinge section 21 and the second hinge section 22, the locking engagement between the locking pawl 8 and the locking portion 10a is released. At this time, the display unit 2 can be rotated by predetermined torque by a torque washer (not shown) provided on the rotational shaft 1A. After that, when the display unit 2 is rotated about the rotational shaft 1A through approximately 45° together with the first and second hinge sections 21 and 22, a rotational motion restricting portion (not shown) restricts further rotation thereof, whereby the display unit 2 is brought into a position suitable for high-angle photographing.

Here, during rotation of the display unit 2 from the closed state to the high-angle photographing state, as shown in FIGS. 11B and 11D, the locking engagement between the locking portion 10b on the side of the second hinge section 22 and the protrusion-shaped portion 12a on the side of the first hinge section 21 is maintained. Therefore, in the high-angle photographing state, the rotation of the display unit 2 about the rotational shaft 1B together with the second hinge section 22 is restricted.

Figure 12:
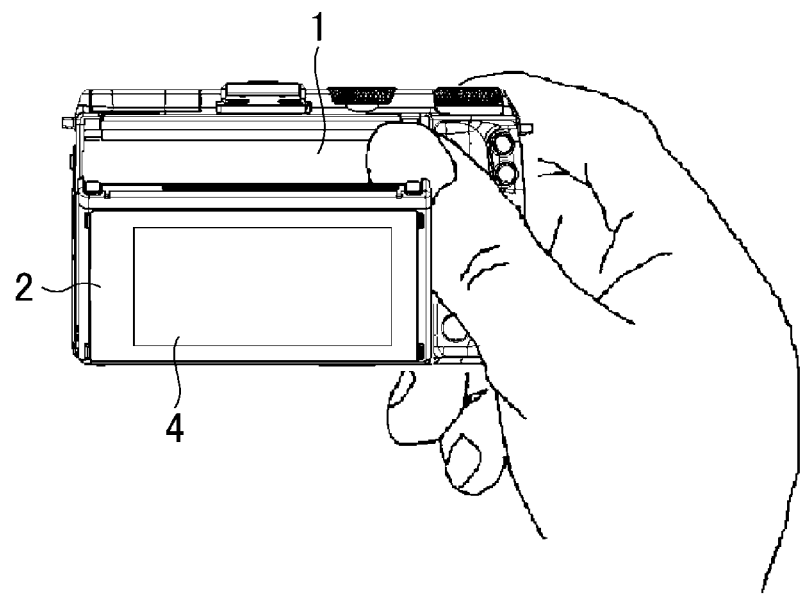
FIG. 12 is a view of the digital camera shown in FIG. 1A in a state in which a finger of a photographer has entered between the display unit and the camera body during high-angle photographing, as viewed from the rear of the camera body.
Figure 13:
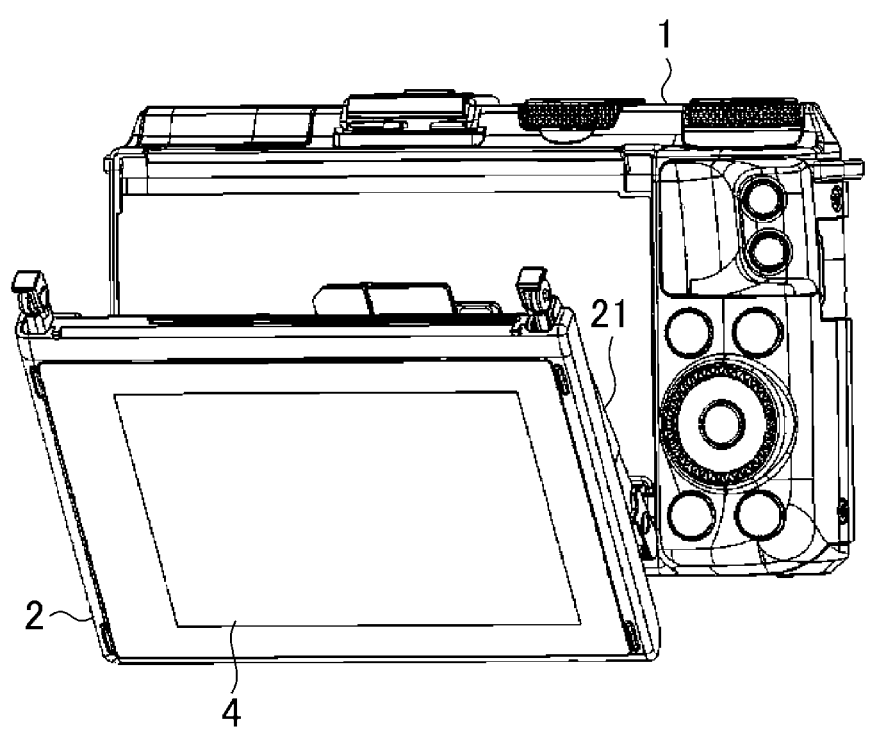
FIG. 13 is a view of the digital camera shown in FIG. 1A in a state in which the orientation of a display screen of the display unit has been changed during high-angle photographing, as viewed from the rear of the camera body.

As described hereinabove, in the present embodiment, during high-angle photographing, the rotation of display unit 2 about the rotational shaft 1B together with the second hinge section 22 is restricted. For this reason, as shown in FIG. 12, it is possible to prevent a finger of the photographer from entering between the display unit 2 and the camera body 1 during high-angle photographing and pushing the display unit 2 from a reverse side thereof, causing a change in the orientation of the display screen of the display unit 2, as shown in FIG. 13. Further, during high-angle photographing, the rotation of the display unit 2 about the rotational shaft 1B is restricted, so that the contact state between the contact portion 5a and the receiving portion 11a is also maintained. Therefore, during high-angle photographing, it is possible to prevent the display unit 2 from being carelessly slid downward by the urging force of the urging spring 7. This makes it possible to prevent the orientation of the display screen of the display unit 2 from being carelessly changed during high-angle photographing.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-168366 filed Aug. 21, 2014 which is hereby incorporated by reference herein in its entirety.

What is claimed is:

1. An electronic apparatus comprising:
a first hinge member configured to be attached to a body of the electronic apparatus such that said first hinge member is rotated with respect to the body of the electronic apparatus about a first rotational shaft;
a second hinge member configured to be attached to said first hinge member such that said second hinge member is rotated with respect to said first hinge member about a second rotational shaft;
a display unit configured to be attached to said second hinge member;
a first locking portion configured to be provided in the body of the electronic apparatus;
a second locking portion configured to be provided in said first hinge member;
a first locked portion configured to be provided in said second hinge member; and
a second locked portion configured to be provided in said second hinge member,
wherein the first rotational shaft is arranged on one side of said first hinge member, and the second rotational shaft is arranged on another side of said first hinge member,
wherein when said display unit is in an accommodated state in which said display unit is accommodated in the body of the electronic apparatus, the body of the electronic apparatus, said first hinge member, said second hinge member, and said display unit are superposed one upon another, whereby said first locking portion locks said first locked portion, and said second locking portion locks said second locked portion, wherein when said display unit is rotated about the first rotational shaft from the accommodated state without being rotated about the second rotational shaft from the accommodated state, locking engagement between said first locking portion and said first locked portion is released while maintaining locking of said second locked portion by said second locking portion, and wherein when said display unit is rotated about the second rotational shaft from the accommodated state, the locking engagement between said first locking portion and said first locked portion is released, and locking engagement between said second locking portion and said second locked portion is released.

2. The electronic apparatus according to claim 1, wherein said second locked portion is provided on an opposite side of a portion of said second hinge member where said first locked portion is provided, and wherein when said display unit is placed in the accommodated state, said first locked portion and said second locked portion are arranged between said first locking portion and said second locking portion.

3. The electronic apparatus according to claim 1, wherein said second hinge member includes a holder for holding said display unit, and wherein said first locked portion and said second locked portion are provided in said holder.

4. The electronic apparatus according to claim 3, wherein said holder is slidably attached to said second hinge member.

5. The electronic apparatus according to claim 1, wherein said first hinge member includes a cover, and wherein said second locking portion is provided on said cover.

6. The electronic apparatus according to claim 5, further comprising a flexible printed circuit board that electrically connects the body of the electronic apparatus and said display unit, wherein said cover protects said flexible printed circuit board.

* * * * *